United States Patent [19]
Renton

[11] Patent Number: 5,123,075
[45] Date of Patent: Jun. 16, 1992

[54] OVERHEAD ELECTRIC AND OPTICAL TRANSMISSION SYSTEMS

[75] Inventor: George Renton, London, England

[73] Assignee: BICC plc, London, England

[21] Appl. No.: 556,450

[22] Filed: Jul. 24, 1990

[30] Foreign Application Priority Data

Jul. 28, 1989 [GB] United Kingdom ............... 8917347

[51] Int. Cl.⁵ ............................................. G02B 6/44
[52] U.S. Cl. .................................. 385/101; 385/114; 385/100; 254/134.4
[58] Field of Search .................... 350/96.23, 96.24; 254/134.4; 385/115, 114, 100, 101, 102

[56] References Cited

U.S. PATENT DOCUMENTS

| | | | |
|---|---|---|---|
| Re. 32,293 | 11/1986 | Dey et al. | 350/96.23 |
| Re. 32,374 | 3/1987 | Dey et al. | 350/96.23 |
| 4,632,506 | 12/1986 | Taylor | 350/96.23 |
| 4,990,033 | 2/1991 | Handley et al. | 254/134.4 X |

FOREIGN PATENT DOCUMENTS

| | | |
|---|---|---|
| 0135132 | 3/1985 | European Pat. Off. . |
| 0108590 | 11/1986 | European Pat. Off. . |
| 63-188106 | 8/1988 | Japan ................................. 350/96.2 |
| 1598438 | 9/1981 | United Kingdom . |
| 2179471 | 3/1987 | United Kingdom . |

Primary Examiner—John D. Lee
Assistant Examiner—Stephen W. Barns
Attorney, Agent, or Firm—Oliff & Berridge

[57] ABSTRACT

In a method of stringing an overhead conductor incorporating an optical fibre ribbon, at least two lengths of overhead conductor, each having a bore within and extending along the length of the conductor, are electrically and mechanically connected end to end in such a way that the bores of interconnected conductor lengths are smoothly continuous and the conductor consisting of the interconnected conductor lengths is strung between a plurality of towers. After the conductor has been strung, the optical fibre ribbon is introduced into and propelled along the bore of the suspended conductor by fluid drag of a gaseous medium.

9 Claims, 3 Drawing Sheets

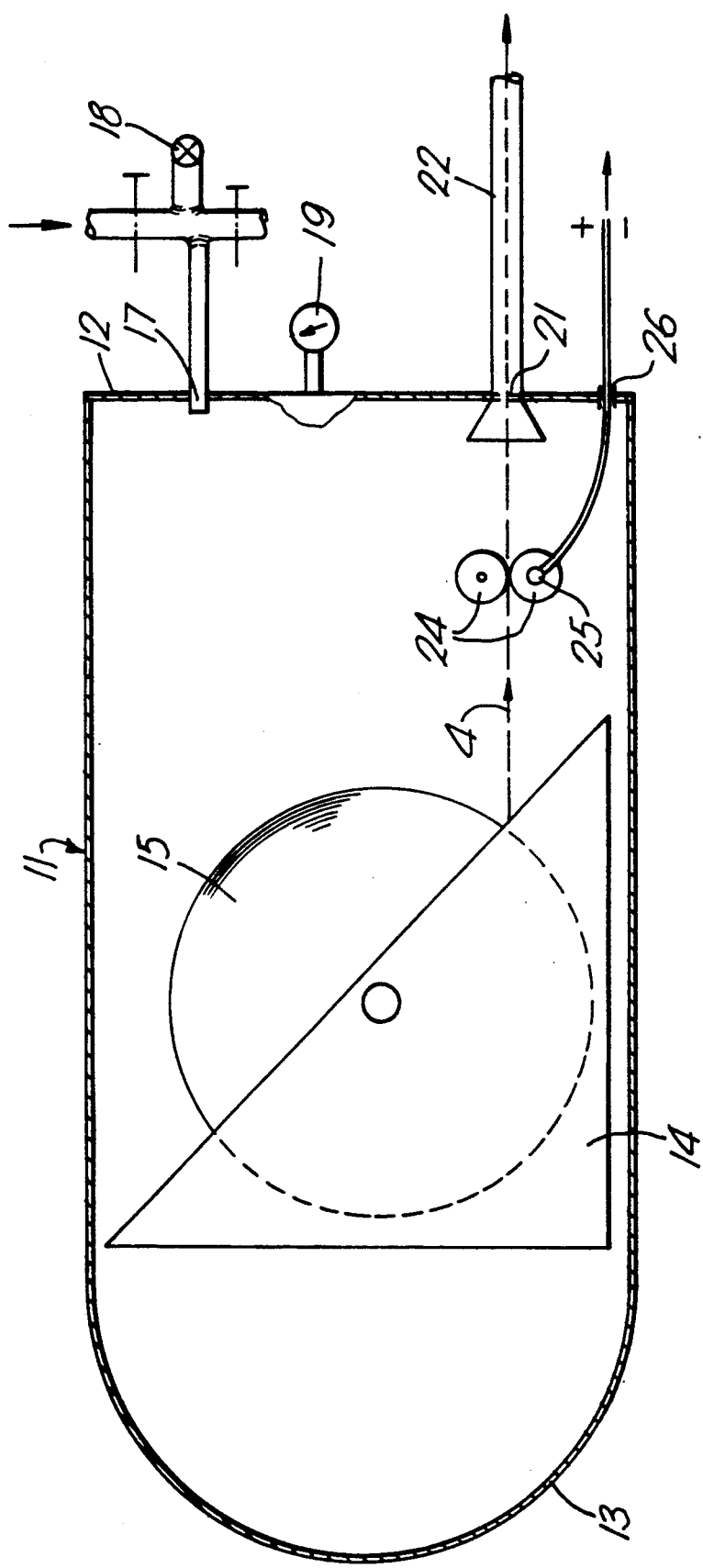

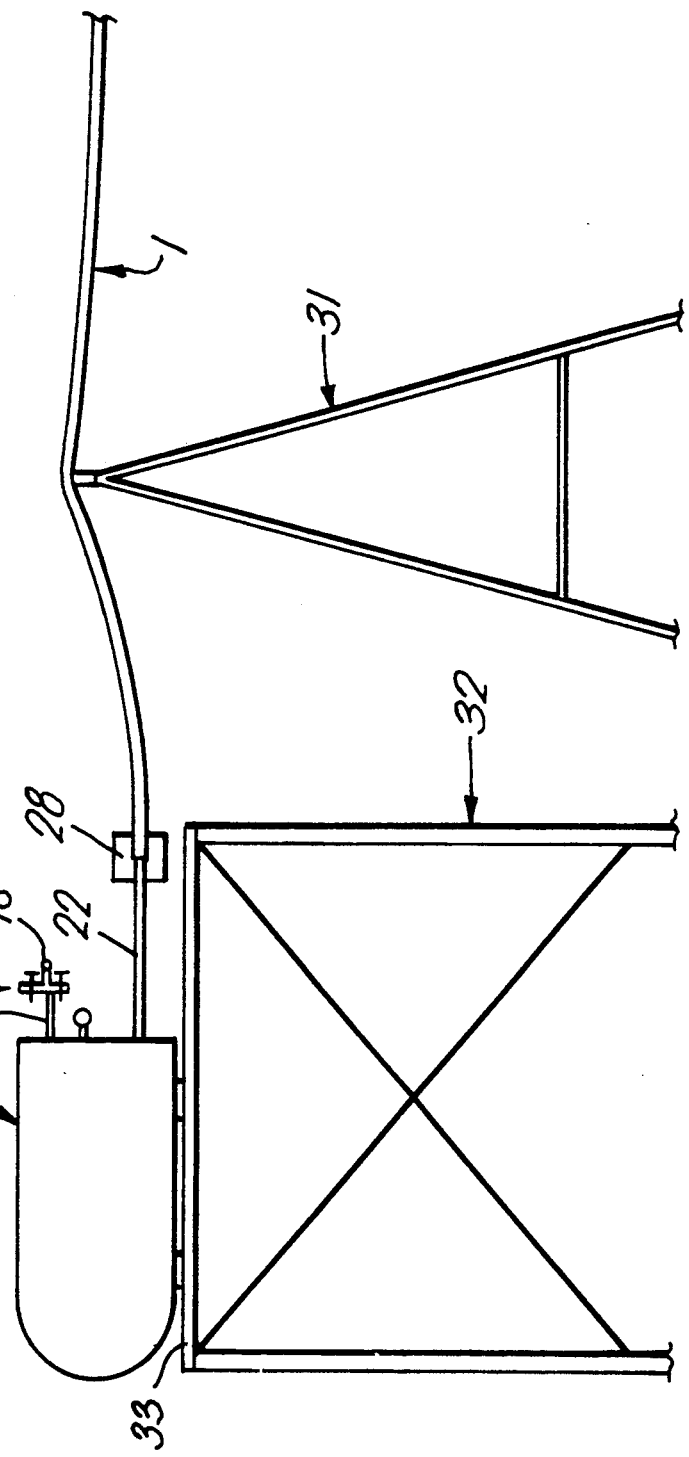

OVERHEAD ELECTRIC AND OPTICAL TRANSMISSION SYSTEMS

This invention relates to an overhead electric and optical transmission system comprising at least one flexible electric conductor incorporating at least one optical fibre suspended freely in long lengths between towers or other upstanding supports mutually spaced along the route of the system.

In the Complete Specification of our British Patent No: 1598438 there is described and claimed a composite flexible overhead electric conductor which is now widely used in overhead electric and optical transmission systems both in the United Kingdom and elsewhere and which Comprises at least one layer of helically wound bare elongate elements of metal or metal alloy, at least one elongate compartment within and extending throughout the length of the conductor, and loosely housed in the elongate compartment or at least one of the elongate compartments, at least one separate optical fibre and/or at least one optical bundle. The present invention is particularly concerned with an overhead electric and optical transmission system comprising one or more than one composite flexible overhead electric and optical conductor in accordance with our aforesaid patent.

The route of an overhead electric transmission system can extend for several kilometres and, when suspending a flexible overhead electric conductor between mutually spaced towers or other upstanding supports of the system it is necessary to interconnect end-to-end, both electrically and mechanically, several individual lengths of flexible conductor because the length of any one of these conductors is limited by the amount of conductor that can be readily wound on a cable drum without damaging the conductor. Thus, in suspending a conductor along the entire route of an overhead electric transmission system, many conductor joints have to be effected.

In the case of an overhead electric and optical transmission system in which a flexible electric conductor incorporates at least one optical fibre, at the position of each conductor joint, one or more than one optical fibre splice or joint must also be effected, depending upon the number of optical fibres in the conductor, thereby substantially increasing the time spent in and hence the cost of suspending the composite conductor in the system. This situation is unfortunate because an optical fibre can be manufactured and wound on a drum or reel, without any splices or joints in the optical fibre, in a length of many kilometres and, in most circumstances, in a length substantially greater than the length of the route of an overhead electric and optical transmission system.

It is an object of the present invention to provide an improved method of suspending between towers or other upstanding supports mutually spaced along the route of an overhead electric and optical transmission system a composite flexible overhead electric and optical conductor comprising at least two lengths of conductor electrically and mechanically connected end-to-end and having within and extending throughout the length of the conductor at least one bore or other passage in which at least one optical fibre is loosely housed, which method will substantially reduce the cost of suspending such a conductor between towers or other upstanding supports of an electric and optical transmission system as compared with methods hitherto proposed and used.

In the improved method according to the invention adjacent lengths of conductor are so electrically and mechanically connected end-to-end that the bores or other passages of said interconnected conductor lengths are substantially smoothly continuous and, after the conductor comprising said interconnected conductor lengths is suspended between a plurality of towers or other upstanding supports mutually spaced along the route of the system, at least one length of flexible optical guide comprising at least one optical fibre is accommodated throughout the length of at least one substantially smoothly continuous bore or other passage within the suspended conductor by introducing a leading end of the length of optical guide into an end of the bore or passage and by propelling the optical guide along the bore or passage of the suspended conductor by fluid drag of a gaseous medium which will have no deleterious effect on the optical guide or on the conductor and which is passed through the bore or passage in the desired direction of advance at such a pressure that the length of optical guide is carried along the bore or passage until the length of optical guide is loosely housed in and throughout the length of said bore or passage of the suspended conductor.

Preferably, the length of optical guide is so accommodated in the substantially smoothly continuous bore or other passage of the suspended conductor that it will substantially exceed the length of the bore or passage so that there is an excess length of optical guide within the bore or passage.

By the expression "substantially smoothly continuous" as used to describe the bore or other passage within the suspended conductor is meant a bore or other passage having no step or other abutment protruding into the bore or other passage at the position of a conductor joint or elsewhere in the length of conductor which might inhibit or restrict carriage of a flexible optical guide along the bore or other passage by the gaseous medium flowing along the bore or passage.

Adjacent lengths of conductor may be electrically and mechanically connected end-to-end after each conductor length has been strung between towers or other upstanding supports of the overhead electric and optical transmission system but, preferably, said adjacent lengths of conductor are electrically and mechanically connected end-to-end before the conductor comprising said interconnected conductor lengths is strung between the towers or other upstanding supports of the system.

Individual lengths of conductor having within and extending throughout the length of conductor at least one bore or other passage may be electrically or mechanically connected end-to-end by any method which will ensure that the bores or other passages of the interconnected conductor lengths are substantially smoothly continuous. Where, as is preferred, each conductor length comprises one or more than one layer of bare elongate elements of metal or metal alloy helically wound around a substantially circumferentially rigid central core having at least one bore or other passage within and extending throughout the length of the core, two such conductor lengths are preferably electrically and mechanically connected end-to-end by means of a sleeve of metal or metal alloy which overlies adjacent end parts of the conductor lengths—that have been so aligned that the axes of the bores or other passages of the conductor lengths are co-linear—and which is compression jointed or otherwise permanently secured to said neighbouring end parts of the conductor lengths.

Stringing of the conductor consisting of said two or more interconnected conductor lengths between a plurality of towers or other upstanding supports mutually spaced along the route of the system can be effected by any known technique.

Preferably, the or each flexible optical guide is propelled along the bore or other passage of the suspended conductor by fluid drag of the gaseous medium using the method and apparatus as described and claimed in our British Patent No: 2179471B, which method comprises rotatably mounting within a substantially fluid-tight housing a reel or spool on which said length of flexible optical guide is wound and feeding the leading end of the optical guide through an outlet of the housing into one end of said bore or other passage within the suspended conductor; directly or indirectly connecting the outlet of the housing to said end of the bore or other passage in such a way as to effect a fluid-tight seal; unwinding the optical guide from the reel or spool by a driving mechanism; and continuously introducing the gaseous medium into the fluid-tight housing, the rate at which the optical guide is unwound from the reel or spool by said driving mechanism and the pressure and rate at which the gaseous medium is continuously introduced into the fluid-tight housing being such that the optical guide is carried along said bore or other passage by a combination of said drive and fluid-drag of the gaseous medium until a length of optical guide is loosely housed in and throughout the length of the bore or other passage. It is, however, to be clearly understood that any suitable method hitherto proposed and used of propelling a flexible optical guide along a bore or other passage by fluid drag of a gaseous medium can be employed.

The or each flexible optical guide to be accommodated in said at least one substantially smoothly continuous bore or other passage within the suspended conductor may be a separate optical fibre or it may be an optical fibre element comprising two or more optical fibres assembled together such as, for example, an optical fibre ribbon comprising a plurality of optical fibres extending side by side with their axes lying in a substantially common plane. One optical fibre ribbon structure which is especially suitable for use in the improved method of the present invention is described and claimed in the specification of our British Patent No: 2141558B.

The invention further includes an overhead electric and optical transmission system comprising at least one composite flexible electric and optical conductor suspended freely in long lengths between towers or other upstanding supports mutually spaced along the route of the system, which conductor has within and extending throughout the length of the conductor at least one bore or other passage in which at least one optical fibre is loosely housed, which comprises at least two lengths of flexible electric conductor electrically and mechanically connected end to end in such a way that the bores or other passages of interconnected conductor lengths are substantially smoothly continuous and which has been suspended freely in long lengths between towers or other upstanding supports mutually spaced along the route of the system by the improved method of the invention, wherein the number of optical fibre splices or joints in the or each optical fibre loosely housed in said at least one smoothly continuous bore or other passage of the interconnected conductor lengths of the suspended conductor is less than the number of electrical and mechanical connections between said conductor lengths.

Preferably, the or each optical fibre loosely housed in said at least one smoothly continuous bore or other passage of the interconnected conductor lengths of the suspended conductor has no optical fibre splice or joint therein.

The invention is further illustrated by a description, by way of example, of the preferred method of suspending between towers mutually spaced along the route of an overhead electric and optical transmission system a composite flexible overhead electric and optical conductor having within and extending throughout the length of the conductor a central bore in which at least one optical fibre is loosely housed, with reference to the accompanying drawings, in which:

FIG. 3 is a diagrammatic side view of one preferred apparatus for accommodating the optical fibre ribbon into the smoothly continuous bore of the suspended conductor shown in FIG. 1, and FIG. 4 is a fragmental diagrammatic side view of a tower at one end of the overhead electric and optical transmission system.

Figure 1:
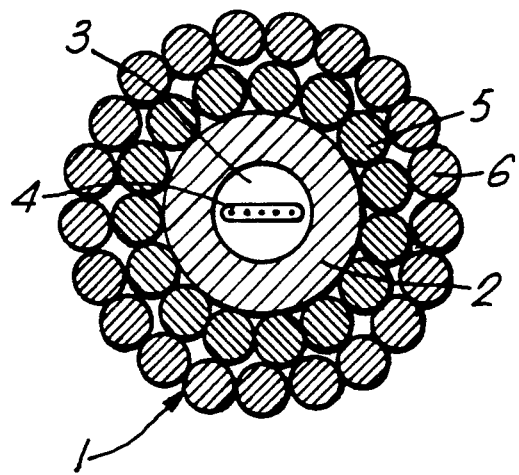
FIG. 1 is a transverse cross-sectional view of the suspended composite flexible overhead electric and optical conductor of the overhead electric and optical transmission system.

Referring to the drawings, the composite conductor 1 shown in FIG. 1 comprises a seamless central tubular core 2 of aluminium having a bore 3 in which is loosely housed an optical fibre ribbon 4 comprising a plurality of optical fibres extending side by side with their axes lying in a substantially common plane, the length of the optical fibre ribbon being substantially greater than the length of the bore. The central core 2 is surrounded by two stranded layers 5 and 6 of round bare wires of aluminium, the directions of lay of the stranded layers being of opposite hand.

Figure 2:
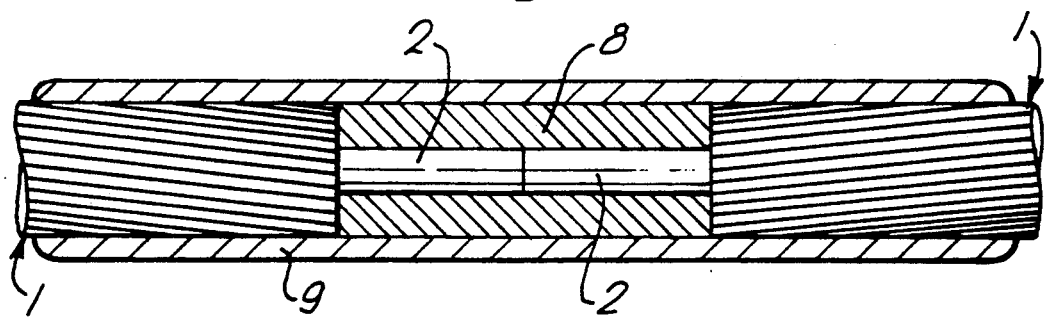
FIG. 2 is a fragmental sectional side view of the preferred method of electrically and mechanically connecting end to end two individual lengths of conductor shown in FIG. 1.

As will be seen on referring to FIG. 2, when two individual lengths of conductor 1 as shown in FIG. 1 are to be electrically and mechanically connected end-to-end, the layers 5 and 6 of helically wound bare wires of each conductor length surrounding the central core 2 are cut back at one end of each conductor to expose a length of the central core and, after a preformed ferrule 9 of aluminium has been passed over the cut back end of one of the conductors 1 and along the conductor, the exposed lengths of the central core of the two conductors are introduced into opposite ends of a preformed tube 8 of aluminium. The aluminium tube 8 has a length such that the ends of the exposed lengths of the central cores 2 abut, has an internal diameter such that the exposed lengths of the central cores are a substantially tight fit in the bore of the tube and has an outer diameter substantially equal to the overall diameters of the conductors 1. The tube 8 serves to maintain the exposed lengths of the central cores 2 in substantially axial alignment with their end faces abutting and with their bores 3 substantially smoothly continuous. The ferrule 9 is then arranged to overlie the aluminium tube 8 and adjacent parts of the conductors 1 and the ferrule is compression jointed to the conductors and to the tube to effect a mechanical and electrical joint between the conductors.

The preferred apparatus shown in FIG. 3 comprises a substantially fluid-tight housing 11 of elongate shape having, at one end of the housing, an end wall 12 and, at the other end of the housing, an end wall 13 of hemispherical shape. Mounted in the housing 11 is a pay-off stand 14 on which can be freely rotatably mounted a reel 15 on which is wound an optical fibre ribbon 4.

In the end wall 12 of the housing 11 is an inlet port 17 through which pressurised air from a source (not shown) can be introduced into the housing, the rate of introduction of the air being controllable by a valve 18. A visual indication of the pressure of the air within the housing 11 can be given by a pressure meter 19.

Connected to an outlet 21 in the end wall 12 of the housing 11 is a pipe 22 of transparent plastics material for insertion into the bore 3 of the central core 2 of the suspended conductor 1 into which optical fibre ribbon 4 from the reel 15 is to be introduced.

Positioned within the housing 11 between the reel 15 and the outlet 21 is a pair of rubber-coated pinch wheels 24, one of which can be rotatably driven through a gearbox (not shown) by a 12 v.d.c. electric motor 25, the leads from the motor passing through a fluid-tight seal in an aperture 26 in the end wall 12 via an electro mechanical relay (not shown), controlled by a programmable controller, to a power supply (not shown).

The housing 11 may have at least one window in its wall and may incorporate an internal lighting system to enable the behaviour of the optical fibre ribbon 4 and the reel 15 to be continuously monitored, thereby giving an indication of any obstruction in the bore 3 of the suspended conductor 1.

When suspending the composite conductor 1 between towers 31 of the electric and optical transmission system shown in FIG. 4, scaffolding 32 supporting a platform 33 is erected adjacent the tower at one end of the system and apparatus as shown in FIG. 3, containing a reel 15 on which optical fibre ribbon 4 is wound, is disposed on the platform. Individual lengths of flexible electric conductor, each having within and extending along the length of conductor a central tubular core 12 having a bore 3, are electrically and mechanically connected end-to-end by the method as described with reference to and illustrated in FIG. 2 in such a way that the bores 3 of interconnected conductor lengths are smoothly continuous. The conductor 1 consisting of these interconnected conductor lengths is then strung between the towers 31 mutually spaced along the route of the system by any known technique. After the conductor has been strung between the towers 31, pipe 22 of the apparatus mounted on the platform 33 is introduced into the bore 3 of the suspended conductor 1 at one end of the conductor and is locked to the conductor by any appropriate locking means 28. Optical fibre ribbon 4 is passed from the reel 15 via a guide tube (not shown) between and in contact with the pair of wheels 24, through another guide tube (not shown), through the pipe 22 and, by means of the motor 25, is fed a short distance into the smoothly continuous bore 3 of the suspended conductor 1.

Air under pressure is then introduced into the housing 11 through the inlet port 17 so that the housing is substantially filled with air at a predetermined pressure, the hemi-spherical end wall 13 of the housing being so shaped as to deflect the air smoothly so that it flows towards and out of the outlet 21 through the pipe 22 and into the smoothly continuous bore 3 of the suspended conductor 1. As the pressure of the air within the housing 11 approaches the required level, the pair of wheels 24 is rotatably driven by the motor 25 at continuously variable speeds between upper and lower limits to produce a pulsing effect serving to provide an intermittent release of optical fibre ribbon 4 from the reel 15. The rate at which the optical fibre ribbon 4 is unwound intermittently from the reel 15 by the pair of wheels 24 and the pressure and rate at which air is continuously introduced into the fluid-tight housing 11 are such that regular pulsed progression of the optical fibre ribbon along the pipe 22 and into the smoothly continuous bore 3 of the suspended conductor 1 is produced by a combination of the continuously varied drive and fluid drag of the air. The process is continued until the desired length of optical fibre ribbon 4 is loosely housed in and throughout the length of the smoothly continuous bore 3 of the suspended conductor 1.

It will be appreciated that the pressure of air introduced into the housing 11 will depend on the relative transverse dimensions of the bore 3 of the suspended conductor 1 and the optical fibre ribbon 4 and on the length of bore into which the optical fibre ribbon is to be introduced. By way of example, the pressure of air introduced into the housing 11 preferably lies in the range 50 to 150 psi but pressures substantially greater than this can be employed.

In addition to reducing substantially the cost otherwise incurred in suspending between towers or other upstanding supports mutually spaced along the route of an overhead electric and optical transmission system a composite flexible overhead electric and optical conductor having within and extending throughout the length of the conductor at least one bore or other passage in which at least one optical fibre is loosely housed, the improved method of the present invention also has the very important advantage that the cost of manufacture of the flexible overhead electric conductor is itself substantially reduced since it is no longer necessary to incorporate the or each flexible optical guide into the conductor during its manufacture. Thus, conventional and long proved successful methods of manufacturing flexible overhead electric conductor can be used and, where the conductor comprises one or more than one layer of bare elongate elements of metal or metal alloy helically wound around a substantially circumferentially rigid central core having a central bore within and extending throughout the length of the core, the central core can be seamless. Furthermore, when effecting the conductor joint, no or very few optical fibre splices or joints are required to be effected in the field, thereby substantially reducing risk of any unsatisfactory optical fibre splices or joints in the overhead optical transmission system that might otherwise be present.

What I claim as my invention is:

1. A method of installing a transmission system comprising the steps of:
    suspending between upstanding supports mutually spaced along the route of an overhead electric and optical transmission system a composite flexible overhead electric and optical conductor comprising at least two lengths of conductor electrically and mechanically connected end-to-end and having within and extending throughout the length of the conductor at least one passage in which at least one optical fibre is loosely housed, wherein adjacent lengths of conductor are so electrically and mechanically connected end-to-end that the passages of said interconnected conductor lengths are substantially smoothly continuous; and after the conductor comprising said interconnected conductor lengths is suspended between a plurality of upstanding supports mutually spaced along the route of the system, accommodating at least one length of flexible optical guide comprising at least one optical fibre throughout the length of at least one substantially smoothly continuous passage within the suspended conductor by introducing a leading end of the length of optical guide into an end of the passage and by propelling the optical guide along the passage of the suspended conductor by fluid drag of a gaseous medium which will have no deleterious effect on the optical guide and on the conductor and which is passed through the passage in the desired direction of advance at such a pressure that the length of optical guide is carried along the passage until the length of optical guide is loosely housed in and throughout the length of said passage of the suspended conductor.

2. A method as claimed in claim 1, wherein the length of optical guide is so accommodated in the substantially smoothly continuous passage of the suspended conductor that it will substantially exceed the length of the passage so that there is an excess length of optical guide within the passage.

3. A method as claimed in claim 1, wherein said adjacent lengths of conductor are electrically and mechanically connected end-to-end before the conductor comprising said interconnected conductor lengths is strung between said upstanding supports.

4. A method as claimed in claim 1 in which each conductor length comprises at least one layer of bare elongate elements of metal or metal alloy helically wound around a substantially circumferentially rigid central core having at least one passage within and extending throughout the length of the core, wherein two such conductor lengths are so aligned end-to-end that the axes of the passages of the conductor lengths are substantially co-linear and said two conductor lengths are electrically and mechanically connected by means of a sleeve of metal or metal alloy which overlies adjacent end parts of the conductor lengths and which is permanently secured to said neighbouring end parts of the conductor lengths.

5. A method as claimed in claim 1, wherein a reel on which said length of flexible optical guide is wound is rotatably mounted within a substantially fluid-tight housing and the leading end of the optical guide is fed through an outlet of the housing into one end of said passage within the suspended conductor; the outlet of the housing is connected to said end of the passage in such a way as to effect a fluid-tight seal; the optical guide is unwound from the reel by a driving mechanism; and the gaseous medium is continuously introduced into the fluid-tight housing, the rate at which the optical guide is unwound from the reel by said driving mechanism and the pressure and rate at which the gaseous medium is continuously introduced into the fluid-tight housing being such that the optical guide is carried along said passage by a combination of said drive and fluid-drag of the gaseous medium until a length of optical guide is loosely housed in and throughout the length of the passage.

6. A method as claimed in claim 1, wherein the or each flexible optical guide is a separate optical fibre.

7. A method as claimed in claim 1, wherein the or each flexible optical guide is an optical fibre element comprising at least two optical fibres assembled together.

8. A method as claimed in claim 7, wherein the optical fibre element is an optical fibre ribbon comprising a plurality of optical fibres extending side by side with their axes lying in a substantially common plane.

9. A method as claimed in claim 1, wherein at least two lengths of optical fibre are spliced end to end to form the at least one optical fibre of said flexible optical guide before the flexible optical guide is accommodated in said smoothly continuous passage, the number of optical splices in the at least one optical fibre of said flexible optical guide being less than the number of electrical and mechanical connections between said conductor lengths.

* * * * *